(12) United States Patent
Hammary (10) Patent No.: US 10,091,568 B2
(45) Date of Patent: Oct. 2, 2018

(54) PORTABLE SPEAKER ASSEMBLY

(71) Applicant: Tahjier Hammary, Tinton Falls, NJ (US)

(72) Inventor: Tahjier Hammary, Tinton Falls, NJ (US)

( * ) Notice: Subject to any disclaimer, the term of this patent is extended or adjusted under 35 U.S.C. 154(b) by 0 days.

(21) Appl. No.: 15/407,781

(22) Filed: Jan. 17, 2017

(65) Prior Publication Data

US 2018/0206012 A1    Jul. 19, 2018

(51) Int. Cl.

| H04R 1/02 | (2006.01) |
|---|---|
| H04R 9/06 | (2006.01) |
| G06F 3/16 | (2006.01) |
| H04R 3/00 | (2006.01) |
| H02J 7/35 | (2006.01) |
| H02J 7/02 | (2016.01) |
| H02J 7/00 | (2006.01) |
| H04R 5/02 | (2006.01) |

(52) U.S. Cl.
CPC ............ *H04R 1/025* (2013.01); *G06F 3/165* (2013.01); *H02J 7/0047* (2013.01); *H02J 7/02* (2013.01); *H02J 7/35* (2013.01); *H04R 1/028* (2013.01); *H04R 3/00* (2013.01); *H02J 2007/005* (2013.01); *H04R 1/02* (2013.01); *H04R 5/02* (2013.01); *H04R 2201/029* (2013.01); *H04R 2205/021* (2013.01); *H04R 2420/07* (2013.01); *H04R 2420/09* (2013.01); *H04R 2499/11* (2013.01)

(58) Field of Classification Search
CPC .... H04R 1/028; H04R 3/00; H04R 2201/029; H04R 2420/07; H04R 2420/09; H04R 1/025; H02J 2007/005; H02J 7/0047; H02J 7/02; H02J 7/35; G06F 3/165
USPC ........................................ 381/386, 334, 394
See application file for complete search history.

(56) References Cited

U.S. PATENT DOCUMENTS

| 6,600,827 | B2 | 7/2003 | Lu | |
|---|---|---|---|---|
| 7,556,121 | B2 | 7/2009 | Yang et al. | |
| 8,103,042 | B2 | 1/2012 | Tan et al. | |
| 8,112,130 | B2 | 2/2012 | Mittleman et al. | |
| 8,265,319 | B2 | 9/2012 | Groset et al. | |
| 2003/0096642 | A1* | 5/2003 | Bessa ...................... | H04M 1/04 455/573 |
| 2003/0157973 | A1 | 8/2003 | Yang | |
| 2006/0269091 | A1* | 11/2006 | Fan ......................... | H04R 5/02 381/386 |
| 2009/0051312 | A1 | 2/2009 | Simon et al. | |
| 2012/0172090 | A1* | 7/2012 | Capps ..................... | H04M 1/03 455/566 |
| 2012/0308064 | A1 | 12/2012 | Matthews | |

* cited by examiner

*Primary Examiner* — Vivian Chin
*Assistant Examiner* — Ubachukwu Odunukwe (57) ABSTRACT

A portable speaker assembly includes a first shell that may insertably receive an electronic device. The first shell is comprised of a rigid material to protect the electronic device from impact damage. A second shell is slidably coupled to the first shell such that each of the first shell and the second shell form a case. The second shell insertably receives the electronic device. The second shell is comprised of a rigid material to protect the electronic device from impact damage. An audio unit is coupled to the case to emit audible sounds outwardly from the case. The audio unit is in wireless electrical communication with the electronic device thereby facilitating the audio unit to receive an audio signal from the electronic device.

1 Claim, 7 Drawing Sheets

PORTABLE SPEAKER ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to speaker devices and more particularly pertains to a new speaker device combining Bluetooth speakers with a smart phone case.

BRIEF SUMMARY OF THE INVENTION

An embodiment of the disclosure meets the needs presented above by generally comprising a first shell that may insertably receive an electronic device. The first shell is comprised of a rigid material to protect the electronic device from impact damage. A second shell is slidably coupled to the first shell such that each of the first shell and the second shell form a case. The second shell insertably receives the electronic device. The second shell is comprised of a rigid material to protect the electronic device from impact damage. An audio unit is coupled to the case to emit audible sounds outwardly from the case. The audio unit is in wireless electrical communication with the electronic device thereby facilitating the audio unit to receive an audio signal from the electronic device.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

With reference now to the drawings, and in particular to FIGS. 1 through 7 thereof, a new speaker device embodying the principles and concepts of an embodiment of the disclosure and generally designated by the reference numeral 10 will be described.

As best illustrated in FIGS. 1 through 7, the portable speaker assembly 10 generally comprises a first shell 12 that may insertably receive an electronic device 14. The first shell 12 is comprised of a rigid material to protect the electronic device 14 from impact damage. The first shell 12 has a first wall 16 and a perimeter wall 18 extending away therefrom. The perimeter wall 18 has a distal edge 20 with respect to the first wall 16 and the distal edge 20 defines an opening 22 into the first shell 12.

The first wall 16 has a first edge 24 and a first surface 26 and the perimeter wall 18 corresponding to the first edge 24 is open. The first edge 24 has a tooth 28 extending outwardly therefrom and the tooth 28 is centrally positioned on the first edge 24. The electronic device 14 may be a smart phone, a tablet or other electronic device 14 having audio and video capabilities. A slide 30 is coupled to and extends away from the first side of the first shell 12.

A second shell 32 is slidably coupled to the first shell 12 such that each of the first shell 12 and the second shell 32 form a case 31. The second shell 32 insertably receives the electronic device 14. Moreover, each of the first 12 and second 32 shells is comprised of a rigid material to protect the electronic device 14 from impact damage.

The second shell 32 has a primary wall 34 and a peripheral wall 36 extending away therefrom and the primary wall 34 has a primary edge 38 and a primary surface 40. The peripheral wall 36 has a distal edge 42 with respect to the primary wall 34 and the distal edge 42 of the peripheral wall 36 defines an opening 44 into the second shell 32. The peripheral wall 36 corresponding to the primary edge 38 is open. Moreover, the primary edge 38 insertably receives the slide 30 such that the second shell 32 is spaced a selected distance from the first shell 12. In this way the case 31 accommodates a variety of sizes of the electronic device 14. The primary edge 38 has a slot 46 extending inwardly therein and the slot 46 is aligned with the tooth 28. The tooth 28 is positioned in the slot 46 when the second shell 32 is urged on the slide 30 to abut the first shell 12.

Figure 7:
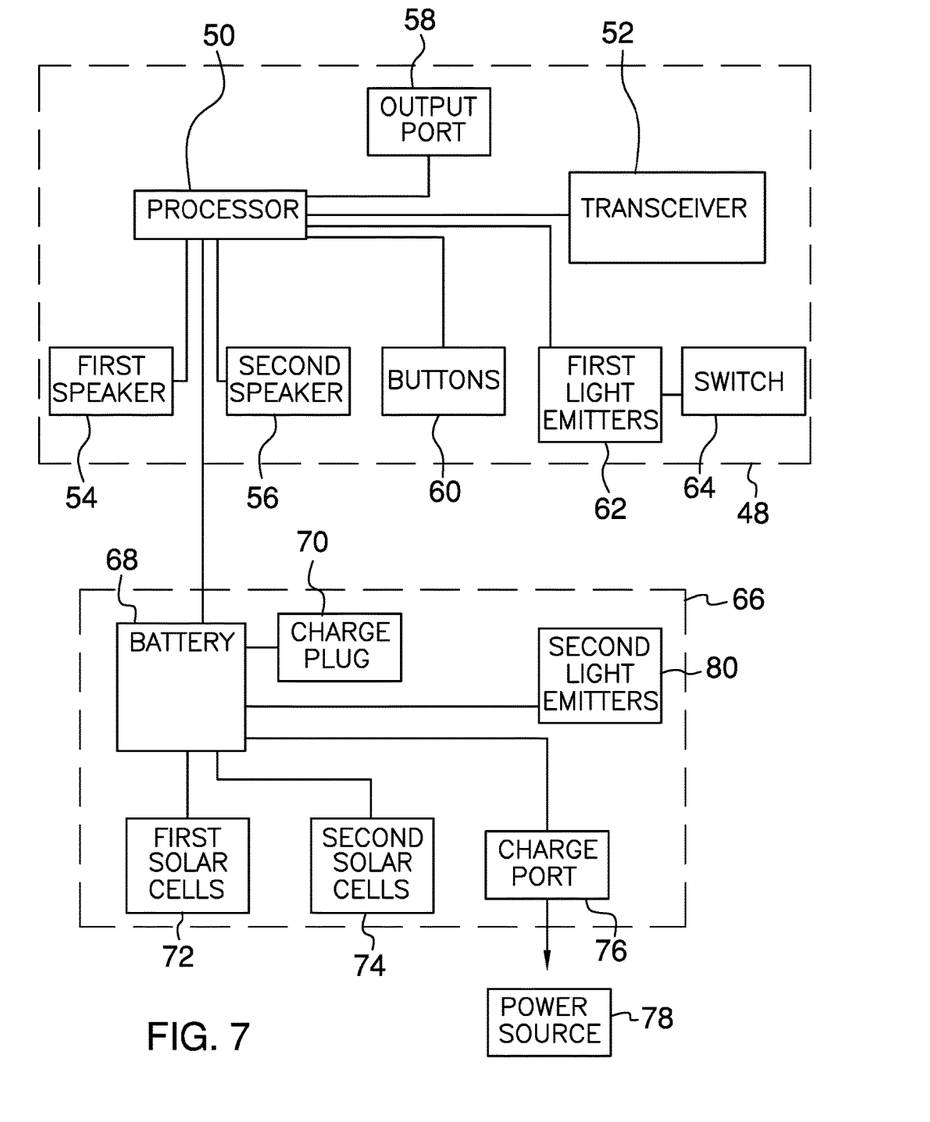
FIG. 7 is a schematic view of an embodiment of the disclosure.

An audio unit 48 is coupled to the case 31 and the audio unit 48 selectively emits audible sounds outwardly from the case 31. The audio unit 48 is in selective wireless electrical communication with the electronic device 14. In this way the audio unit 48 selectively receives an audio signal from the electronic device 14.

The audio unit 48 comprises a processor 50 that is coupled to the case 31. The processor 50 may be an electronic processor 50 or the like. A transceiver 52 is coupled to the case 31 and the transceiver 52 is electrically coupled to the processor 50. The transceiver 52 is in selectively electrical communication with the electronic device 14 such that the transceiver 52 communicates the audio signal to the processor 50. Additionally, the transceiver 52 may be selectively placed in electrical communication with a remote electronic device that is within a broadcast area of the transceiver 52. The remote electronic device may be any electronic device other than the electronic device 14 that is positioned in the case 13. Moreover, the transceiver 52 may radio frequency transceiver and the transceiver 52 may employ Bluetooth communication protocols.

A first speaker 54 is coupled to the first surface 26 of the first shell 12 to emit audible sounds. The first speaker 54 is electrically coupled to the processor 50 such that the first speaker 54 receives the audio signal. A second speaker 56 is coupled to the primary surface 40 of the second shell 32 to emit audible sounds. The second speaker 56 is electrically coupled to the processor 50 such that the second speaker 56 receives the audio signal. Each of the first 54 and second 56 speakers may be electronic speakers or the like.

An output port 58 is coupled to the case 31 and the output port 58 is electrically coupled to the processor 50. The output port 58 may be selectively electrically coupled with a remote electronic device that is not related to the electronic device 14 that is positioned in the case 31. The remote electronic device may be an audio system, a computer or any other electronic device having audio capabilities. Additionally, the output port 58 may be a usb port or the like.

A plurality of buttons 60 is provided and each of the buttons 60 is coupled to the case 31. Each of the buttons 60 is electrically coupled to the processor 50 such that each of the buttons 60 controls operational parameters of the processor 50. Moreover, each of the buttons 60 may be an illuminated, touch sensitive pad or the like.

The plurality of buttons 60 may include a power button, a synch button, a volume up button and a volume down button. The power button turns the processor 50 on and off when the power button is manipulated. The synch button synchronizes the transceiver 52 with the electronic device 14 in the convention of Bluetooth communication. The volume up button increases a volume of audio emitted by the first 54 and second 56 speakers. Finally, the volume down button decreases the volume of audio emitted by the first 54 and second 56 speakers.

A plurality of first light emitters 62 is provided and each of the first light emitters 62 is coupled to the case 31. The light emitters 62 selectively emit light to illuminate a darkened area. The first light emitters 62 are spaced apart from each other and are distributed along the distal edge 20,42 corresponding to each of the first shell 12 and the second shell 32. Each of the first light emitters 62 is electrically coupled to the processor 50. A switch 64 is movably coupled to the case 31 and the switch 64 is selectively manipulated between an on position and an off position. The switch 64 is electrically coupled to the plurality of first light emitters 62 to turn the plurality of first light emitters 62 on and off. Each of the first light emitters 62 may comprise an LED or the like.

A power supply 66 is coupled to the case 31 and the power supply 66 is electrically coupled to the processor 50. The power supply 66 comprises at least one battery 68 that is coupled to the case 31. The at least one battery 68 is electrically coupled to the processor 50 and a charge plug 70 is removably coupled to the second shell 32. The charge plug 70 is electrically coupled to the electronic device 14 when the electronic device 14 is positioned in the case 31. The charge plug 70 is electrically coupled to the at least one battery 68 thereby enhancing a battery life of the electronic device 14 when the electronic device 14 is positioned in the case 31. The output port 58 is in electrical communication with the at least one battery 68. In this way the remote electronic device may be charged via the output port 58.

A plurality of first solar cells 72 is provided and each of the first solar cells 72 is coupled to the first surface 26 of the first shell 12. In this way each of the first solar cells 72 is selectively exposed to sunlight. Each of the first solar cells 72 is electrically coupled to the at least one battery 68 such that each of the first solar cells 72 charge the at least one battery 68.

A plurality of second solar cells 74 is provided and each of the second solar cells 74 is coupled to the primary surface 40 of the second shell 32. In this way each of the second solar cells 74 is selectively exposed to sunlight. Each of the second solar cells 74 is electrically coupled to the at least one battery 68 such that each of the second solar cells 74 charge the at least one battery 68. Each of the first solar cells 72 and the second solar cells 74 may supply electrical current to the electronic device 14 via the charge plug 70 when the electronic device 14 is positioned in the case 31. Additionally, each of the first 72 and second 74 solar cells may supply electrical current to the remote electronic device via the output port 58.

A charge port 76 is coupled to the perimeter wall 18 of the first case 31 and the charge port 76 is selectively electrically coupled to a power source 78. The power source 78 may be a battery charger or the like. The charge port 76 is electrically coupled to the at least one battery 68 to charge the at least one battery 68. Additionally, the at least one battery 68 may be wirelessly charged with a wireless battery charger.

A plurality of second light emitters 80 is provided and each of the second light emitters 80 is coupled to the primary wall 34 of the second shell 32. Each of the second light emitters 80 is electrically coupled to the at least one battery 68. In this way the plurality of second light emitters 80 communicates a charge level of the at least one battery 68.

Figure 1:
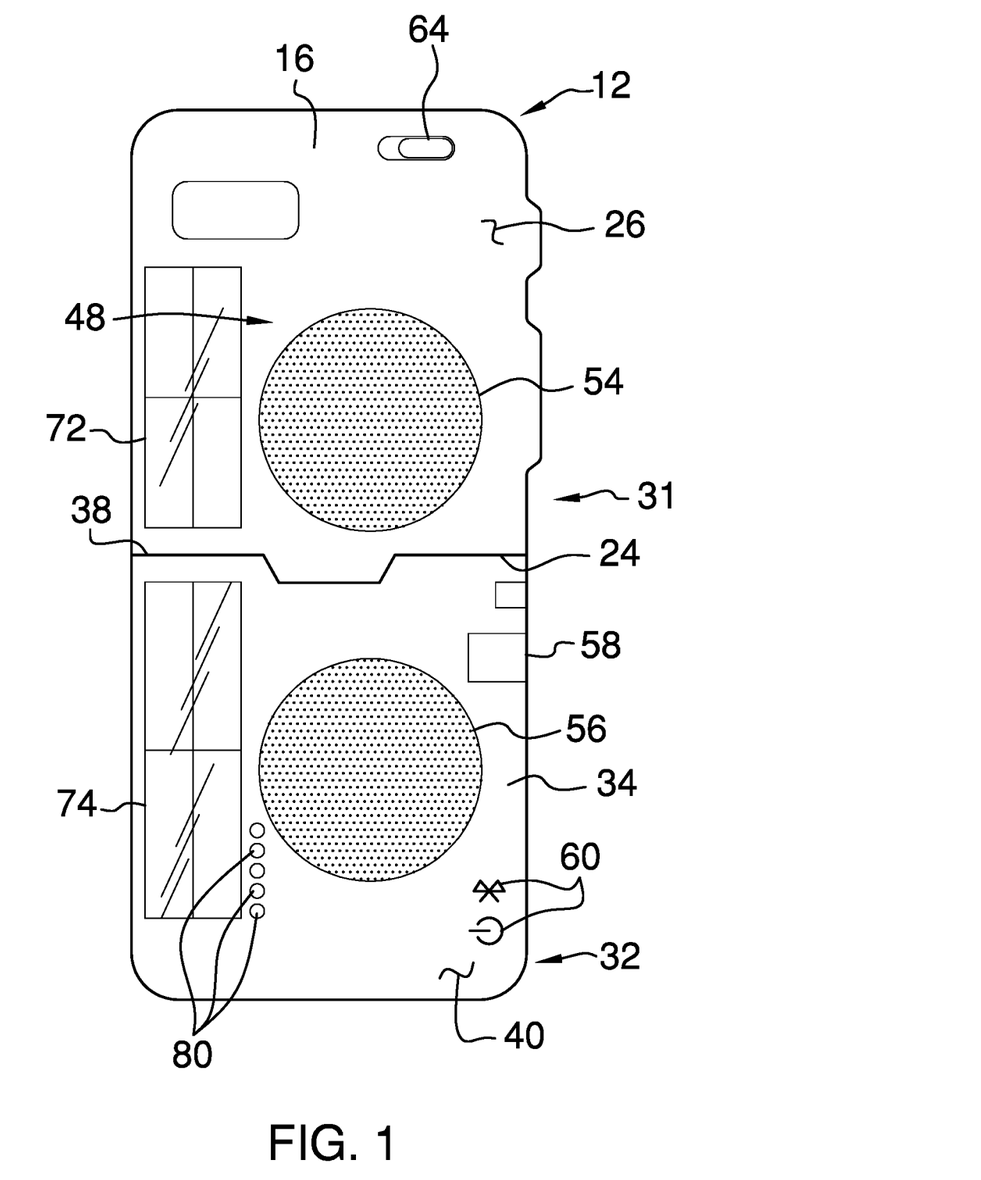
FIG. 1 is a back view of a portable speaker assembly according to an embodiment of the disclosure.
Figure 2:
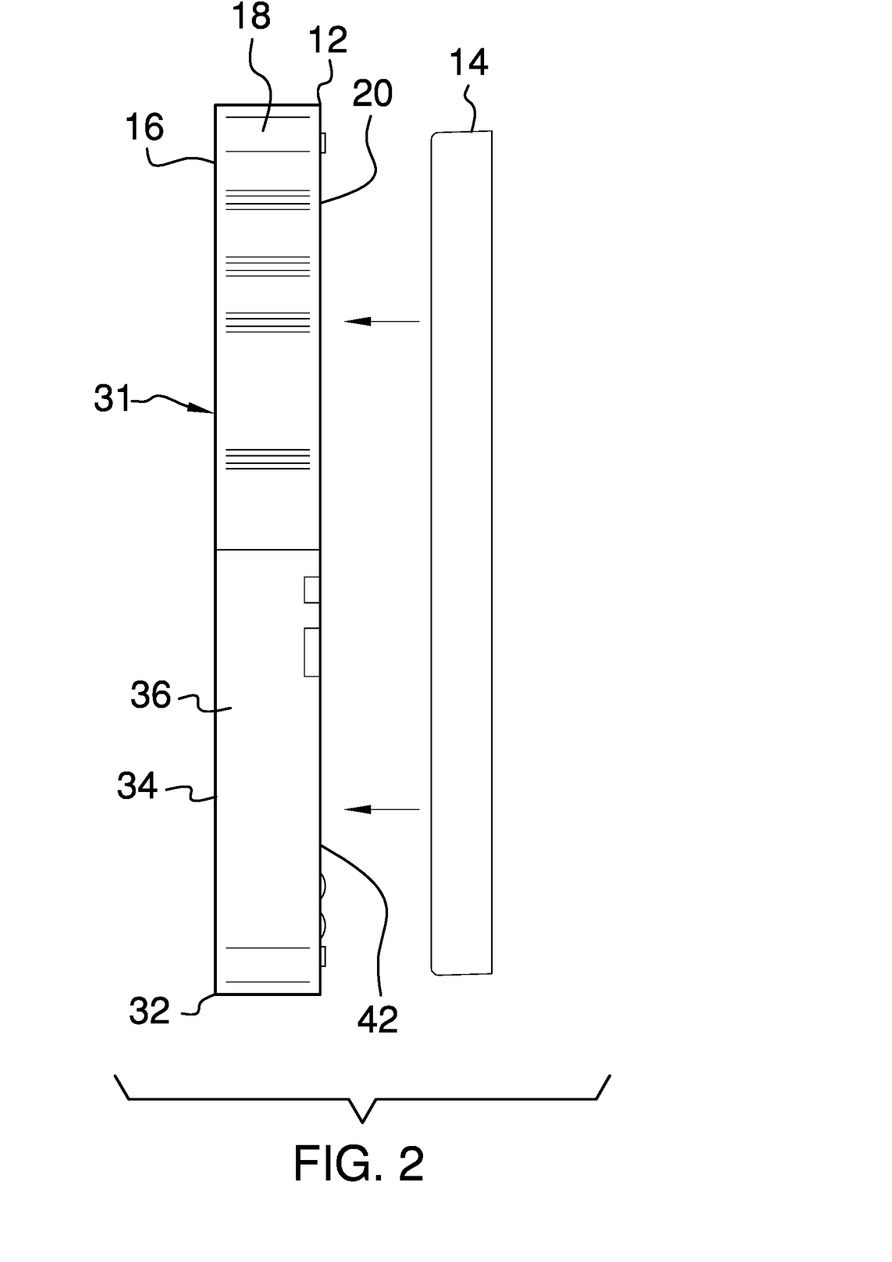
FIG. 2 is a right side view of an embodiment of the disclosure.
Figure 3:
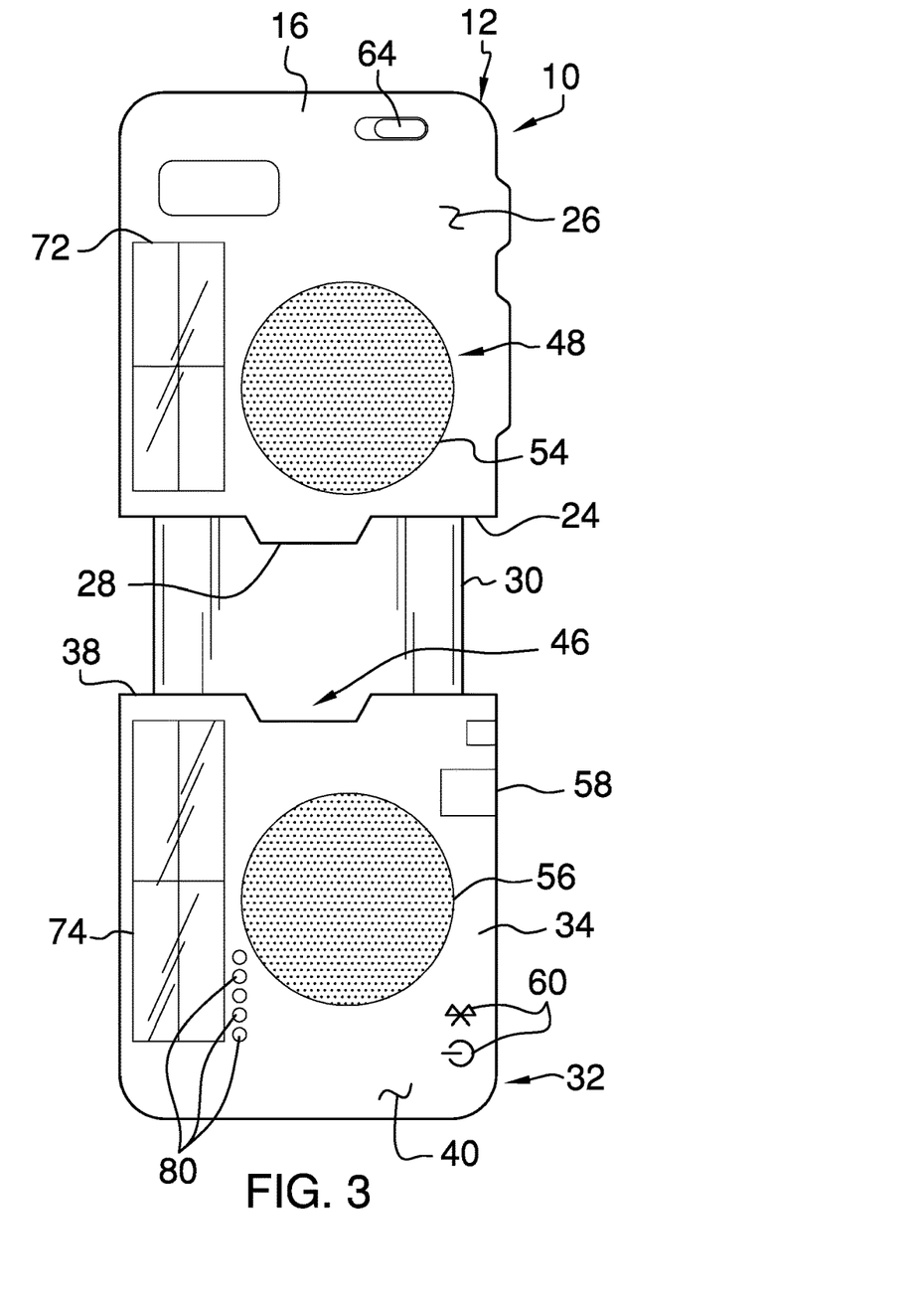
FIG. 3 is a back perspective view of an embodiment of the disclosure.
Figure 4:
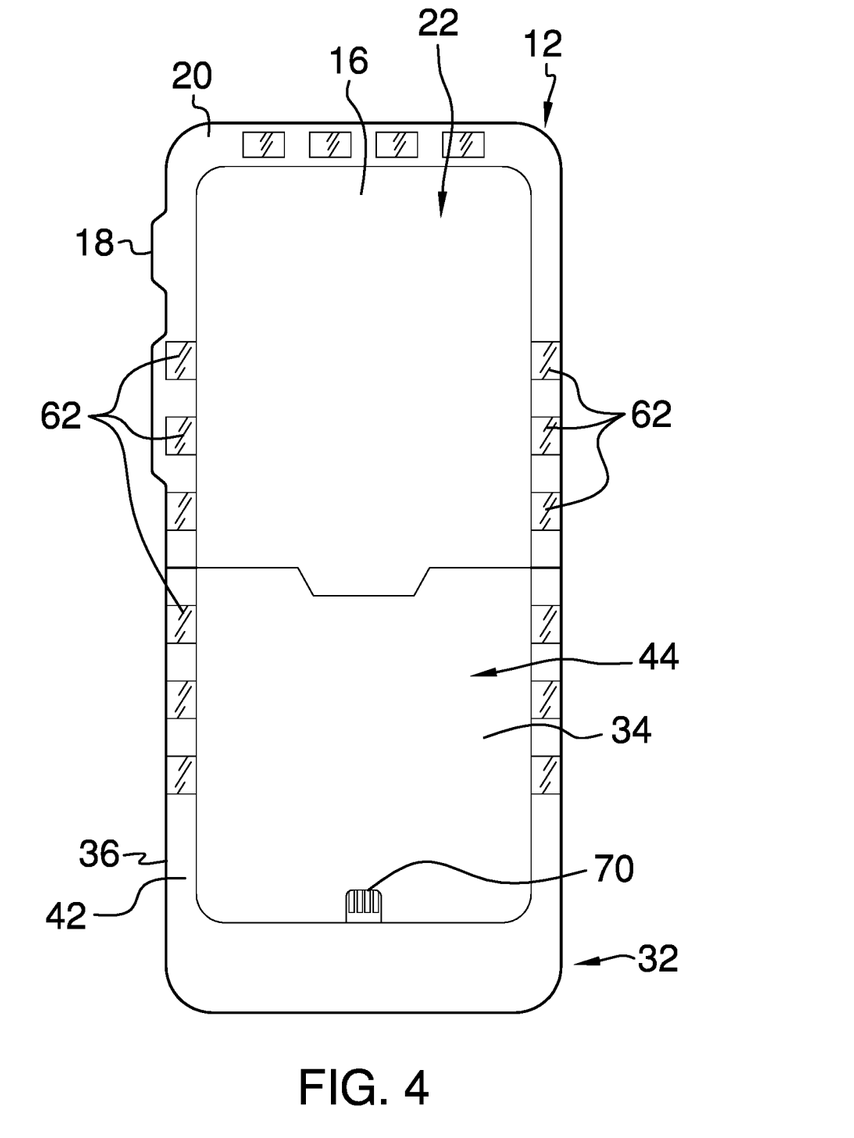
FIG. 4 is a front view of an embodiment of the disclosure.
Figure 5:
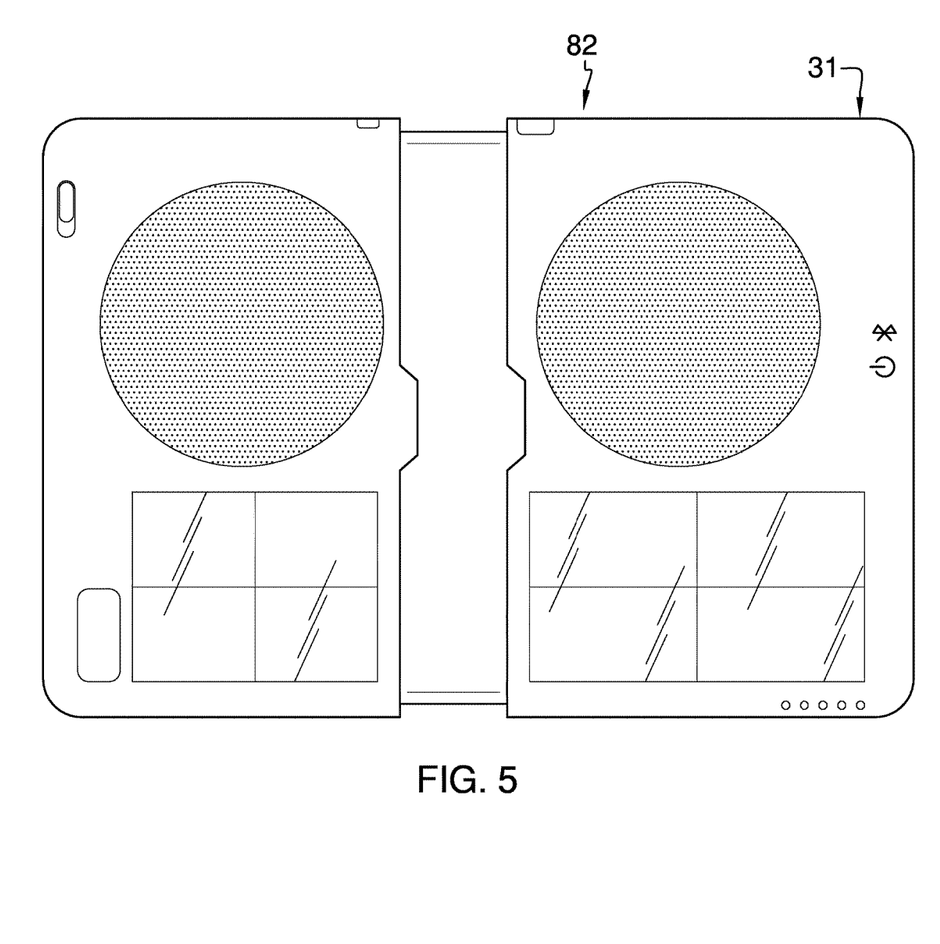
FIG. 5 is a back view of an alternative embodiment of the disclosure.
Figure 6:
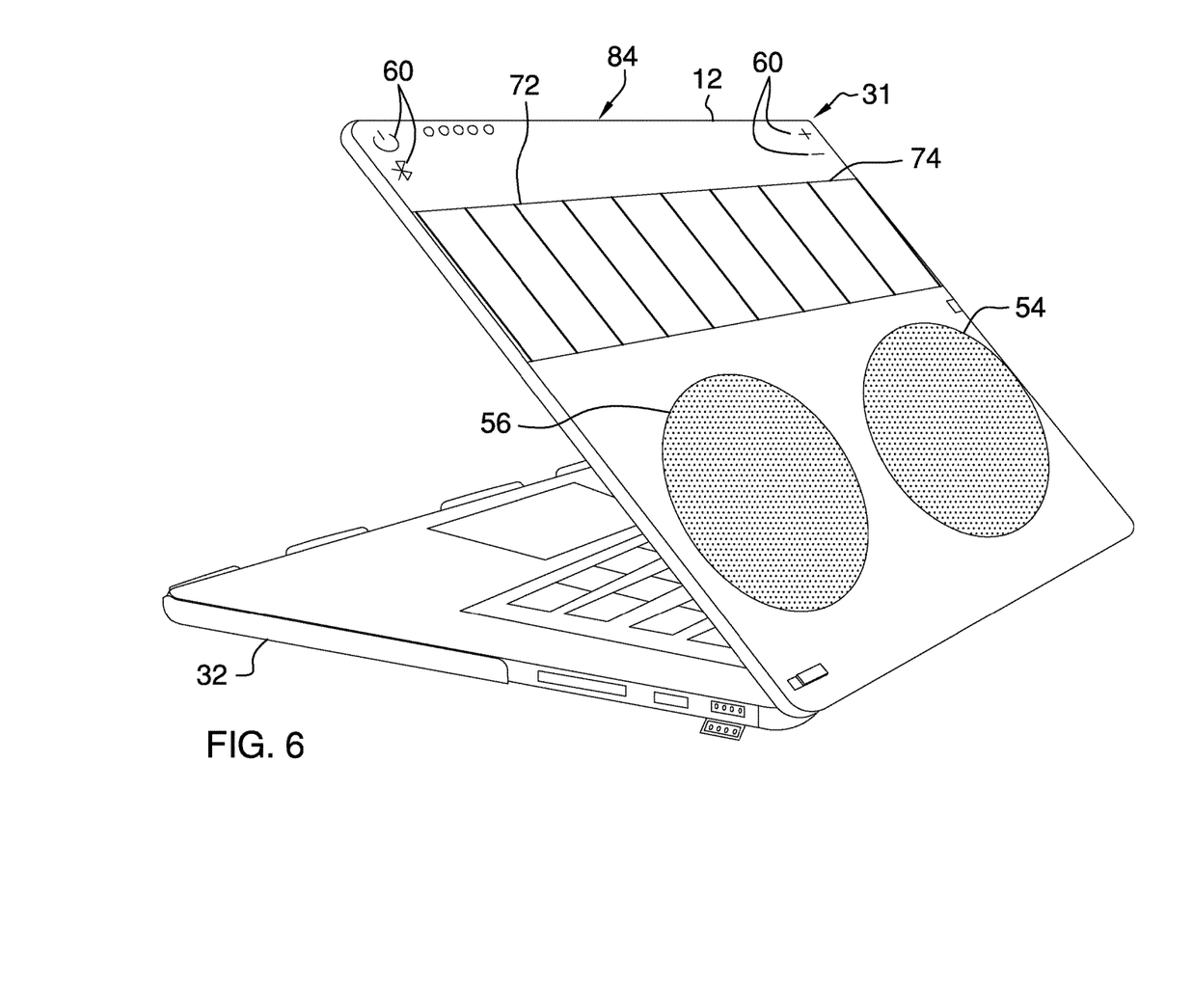
FIG. 6 is a perspective view of an alternative embodiment of the disclosure.

In an alternative embodiment 82 as shown in FIG. 5, the case 31 may have a width that is greater than a width of the case 31 as shown in FIGS. 1 through 4. Thus, the case 31 in the alternative embodiment 82 may accommodate an ipad, a tablet or any other enlarged electronic device with respect to a smart phone. In an alternative embodiment 84 as shown in FIG. 6, the first shell 12 may be hingedly coupled to the second shell 32. Moreover, the case 31 in FIG. 6 may insertably receive a laptop computer or the like. Each of the first speaker 54, the second speaker 56, the first solar cells 72, the second solar cells 74 and the plurality of buttons 60 may be positioned on the second shell 32.

In use, the electronic device 14 is positioned in the case 31 and the second shell 32 is manipulated on the slide 30 to enclose the electronic device 14 in the case 31. The power button is manipulated to turn the processor 50 on and the synch button is manipulated to synch the transceiver 52 with the electronic device 14. Thus, each of the first speaker 54 and the second speaker 56 emit audio received from the electronic device 14. The power supply 66 in the case 31 enhances a battery life of the electronic device 14 via the charge plug 70. Additionally, the power supply 66 enhances a battery life of the remote electronic device via the output port 58. The transceiver 52 is selectively synched with the remote electronic device when the remote electronic device is within a broadcast area of the transceiver 52. In this way the transceiver 52 receives an audio signal from the remote electronic device. The power supply may simultaneously charge the electronic device 14 positioned in the case 31 and the remote electronic device via the output port 58 while the first 54 and second 56 speakers emit the audio received from the remote electronic device.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A portable speaker assembly being configured to be positioned on an electronic device thereby facilitating said assembly to protect the electronic device from impact, said assembly comprising:

a first shell being configured to insertably receive an electronic device, said first shell being comprised of a rigid material wherein said first shell is configured to protect the electronic device from impact damage, said first shell having a first wall and a perimeter wall extending away therefrom, said perimeter wall having a distal edge with respect to said first wall, said distal edge defining an opening into said first shell, said first wall having a first edge and a first surface, said perimeter wall corresponding to said first edge being open, said first edge having a tooth extending outwardly therefrom, said tooth being centrally positioned on said first edge;

a slide being coupled to and extending away from said first side of said first shell;

a second shell being slidably coupled to said first shell such that each of said first shell and said second shell form a case, said second shell being configured to insertably receive the electronic device, said second shell being comprised of a rigid material wherein said second shell is configured to protect the electronic device from impact damage, said second shell having a primary wall and a peripheral wall extending away therefrom, said primary wall having a primary edge and a primary surface, said peripheral wall corresponding to said primary edge being open, said primary edge insertably receiving said slide such that said second shell is spaced a selected distance from said first shell wherein said case is configured to accommodate a variety of sizes of the electronic device, said primary edge having a slot extending inwardly therein, said slot being aligned with said tooth, said tooth being positioned in said slot when said second shell is urged on said slide to abut said first shell; and an audio unit being coupled to said case wherein said audio unit is configured to emit audible sounds outwardly from said case, said audio unit being configured to be in wireless electrical communication with the electronic device thereby facilitating said audio unit to receive an audio signal from the electronic device, said audio unit comprising:

a processor being coupled to said case, a transceiver being coupled to said case, said transceiver being electrically coupled to said processor, said transceiver being configured to be in electrical communication with the electronic device such that said transceiver communicates the audio signal to said processor, a first speaker being coupled to said first surface of said first shell wherein said first speaker is configured to emit audible sounds, said first speaker being electrically coupled to said processor such that said first speaker receives the audio signal, a second speaker being coupled to said primary surface of said second shell wherein said second speaker is configured to emit audible sounds, said second speaker being electrically coupled to said processor such that said second speaker receives the audio signal, a plurality of buttons, each of said buttons being coupled to said case wherein each of said buttons is configured to be manipulated, each of said buttons being electrically coupled to said processor such that each of said buttons controls operational parameters of said processor, and a power supply being coupled to said case, said power supply being electrically coupled to said processor, said power supply comprising:

at least one battery being coupled to said case, said at least one battery being electrically coupled to said processor, a charge plug being removably coupled to said second shell wherein said charge plug is configured to be electrically coupled to the electronic device when the electronic device is positioned in said case, said charge plug being electrically coupled to said at least one battery, a plurality of first solar cells, each of said first solar cells being coupled to said first surface of said first shell wherein each of said first solar cells is configured to be exposed to sunlight, each of said first solar cells being electrically coupled to said at least one battery such that each of said first solar cells charge said at least one battery, a plurality of second solar cells, each of said second solar cells being coupled to said primary surface of said second shell wherein each of said second solar cells is configured to be exposed to sunlight, each of said second solar cells being electrically coupled to said at least one battery such that each of said second solar cells charge said at least one battery, a charge port being coupled to said perimeter wall of said first case wherein said charge port is configured to be electrically coupled to a power source, said charge port being electrically coupled to said at least one battery, and a plurality of light emitters, each of said light emitters being coupled to said primary wall of said second shell, each of said light emitters being electrically coupled to said at least one battery such that said plurality of light emitters communicates a charge level of said at least one battery.

* * * * *